US011875315B2

(12) United States Patent
Xu

(10) Patent No.: US 11,875,315 B2
(45) Date of Patent: Jan. 16, 2024

(54) VIRTUAL CURRENCY SETTLEMENT METHOD, APPARATUS, AND ELECTRONIC DEVICE

(71) Applicant: Antpool Technologies Limited, Wanchai (HK)

(72) Inventor: Lingchao Xu, Singapore (SG)

(73) Assignee: ANTPOOL TECHNOLOGIES LIMITED, Wanchai (HK)

( * ) Notice: Subject to any disclaimer, the term of this patent is extended or adjusted under 35 U.S.C. 154(b) by 317 days.

(21) Appl. No.: 16/878,953

(22) Filed: May 20, 2020

(65) Prior Publication Data
US 2020/0286048 A1 Sep. 10, 2020

Related U.S. Application Data

(63) Continuation of application No. PCT/CN2018/116516, filed on Nov. 20, 2018.

(30) Foreign Application Priority Data

Nov. 20, 2017 (CN) .......................... 201711160437.1

(51) Int. Cl.
*G06Q 40/00* (2023.01)
*G06Q 20/06* (2012.01)
*G06Q 20/22* (2012.01)

(52) U.S. Cl.
CPC .......... *G06Q 20/065* (2013.01); *G06Q 20/223* (2013.01)

(58) Field of Classification Search
CPC .............. G06Q 20/065; G06Q 20/223; G06Q 2220/00; G06Q 40/04; H04L 2209/38; H04L 2209/56
See application file for complete search history.

(56) References Cited

U.S. PATENT DOCUMENTS 8,229,845 B2 * 7/2012 Shintani ................. G06Q 20/10
705/35
2011/0196797 A1 * 8/2011 Liwerant .............. G06Q 50/188
705/71
(Continued)

FOREIGN PATENT DOCUMENTS

CA 3005185 C * 9/2020 ............. G06Q 20/02
CN 106911470 A 6/2017
(Continued)

OTHER PUBLICATIONS

Hameed et al: "The Art of Crypto Currencies A Comprehensive Analysis of Popular Crypto Currencies", (IJACSA) International Journal of Advanced Computer Science and Applications, vol. 07, No. 12 (Year: 2016).*
(Continued)

*Primary Examiner* — Edward J Baird
(74) *Attorney, Agent, or Firm* — Maier & Maier, PLLC

(57) ABSTRACT

The present disclosure provides a currency settlement method and apparatus. The currency settlement method includes: settling with a mining node that acquired a first virtual currency according to a workload performed by the mining node and an income type of the mining node; according to a settlement currency type, transacting with an exchange institution to exchange an amount in the first virtual currency into an amount in a second virtual currency, the second virtual currency being the settlement currency type; and transferring the amount of the second virtual currency to an account.

6 Claims, 15 Drawing Sheets

(56) References Cited

U.S. PATENT DOCUMENTS

| | | | |
|---|---|---|---|
| 2015/0170112 A1 | 6/2015 | Decastro | |
| 2015/0332256 A1 | 11/2015 | Minor | |
| 2015/0363769 A1 | 12/2015 | Ronca et al. | |
| 2016/0203477 A1* | 7/2016 | Yang | G06Q 20/3829 |
| | | | 705/69 |
| 2016/0239813 A1 | 8/2016 | Ko | |
| 2017/0103458 A1 | 4/2017 | Pierce et al. | |
| 2017/0221053 A1* | 8/2017 | Goloshchuk | G06Q 20/202 |
| 2017/0243177 A1* | 8/2017 | Johnsrud | G06Q 20/10 |
| 2019/0228407 A1* | 7/2019 | Wu | G06Q 20/3678 |
| 2020/0226589 A1* | 7/2020 | Nakamura | G06Q 40/025 |

FOREIGN PATENT DOCUMENTS

| | | |
|---|---|---|
| CN | 107886314 A | 4/2018 |
| RU | 2 584 506 C1 | 5/2016 |

OTHER PUBLICATIONS

Russian Office Action dated Dec. 23, 2020, in connection with corresponding RU Application No. 2020120294/28(034544) (14 pp.).
Extended European Search Report dated Nov. 12, 2020, in connection with corresponding EP Application No. 18877723.9; 7 pages.
International Search Report and Written Opinion dated Feb. 27, 2019 in corresponding International application No. PCT/CN2018/116516; 8 pages.

* cited by examiner

VIRTUAL CURRENCY SETTLEMENT METHOD, APPARATUS, AND ELECTRONIC DEVICE

CROSS-REFERENCE TO RELATED APPLICATION

This application is a continuation of International Application No. PCT/CN2018/116516, filed on Nov. 20, 2018, which claims the priority to Chinese Patent Application No. 201711160437.1, entitled "VIRTUAL CURRENCY SETTLEMENT METHOD, APPARATUS, AND ELECTRONIC DEVICE", filed on Nov. 20, 2017. The disclosures of the aforementioned applications are hereby incorporated by reference in their entireties.

FIELD

The present disclosure relates to the field of information processing, and in particular, to a virtual currency settlement method, apparatus, and electronic device.

BACKGROUND

With the continuous development of information technology, blockchains have been under rapid development. Blockchain technology is the underlying technology of the cryptocurrency Bitcoin which emerged in 2008. A blockchain refers to a chain of blocks generated by cryptographic methods. The block data in each block in the blockchain is associated with the block data in the previous block. In order to ensure that the blocks in the blockchain can be quickly and correctly generated, in the data sharing system of the blockchain technology, mining nodes are used to generate the blocks. A mining node refers to one or more mining machines, which are computers used to mine blockchain data. The mining nodes are connected into a cryptocurrency mining pool system in the data sharing system. Through the P2P (peer-to-peer) network, the mining nodes listen to the shared broadcast in the data sharing system. They confirm the shared broadcast and generate blocks including the shared broadcast data. After the forgoing operations are completed, the cryptocurrency mining pool system settles with the mining nodes according to the work they performed, so that the mining nodes may earn certain amount of currency for accelerating the processing of the shared broadcast.

When the cryptocurrency mining pool system settles the work with a mining node, it generally determines the currency of income generated by the mining node in the data sharing system, and determines which virtual currency is used to settle with the mining node according to the type of income. For example, if the work performed by the mining node produces bitcoins in the data sharing system, the cryptocurrency mining pool system uses bitcoins for settlement when the work of the mining node is being settled.

Different mining nodes may generate different types of income in the data-sharing system, for example, the income type may be Bitcoin, Litecoin, Ethereum, and so on. In order to maintain normal settlement processes with the mining nodes, the mining pool system may need to manage a plurality of different types of virtual currencies, increasing the workload of the mining pool system during settlement, and increasing the cost of mining pool system development.

SUMMARY

In order to overcome the problem in virtual currency settlement that the mining pool system needs to manage multiple types of virtual currencies, the present disclosure provides a virtual currency settlement method, apparatus and electronic device.

According to one aspect of the present disclosure, a virtual currency settlement method for a cryptocurrency mining pool system is provided. The virtual currency settlement method includes: settling with a mining node that acquired a first virtual currency according to a workload performed by the mining node and an income type of the mining node; according to a settlement currency type, transacting with an exchange institution to exchange an amount in the first virtual currency into an amount in a second virtual currency, where the second virtual currency is the settlement currency type; and transferring the amount of the second virtual currency to an account.

In certain embodiments according to the present disclosure, the virtual currency settlement method for the cryptocurrency mining pool system further includes: sending a transaction request to the exchange institution, where the transaction request includes at least the settlement currency type and the amount of the first virtual currency; receiving a transaction confirmation command from the exchange institution; transferring the amount of the first virtual currency to the exchange institution; and receiving the amount of the second virtual currency from the exchange institution.

In certain embodiments, after transferring the amount of the second virtual currency to the account, the virtual currency settlement method further includes: determining an exchange rate between the first virtual currency and the second virtual currency; and sending the exchange rate to the mining node to present the exchange rate on a user interface.

In certain embodiments according to the present disclosure, the virtual currency settlement method for the cryptocurrency mining pool system further includes: detecting the mining node accessing the cryptocurrency mining pool system; acquiring a node identifier associated with the mining node; acquiring one or more settlement currency types; and storing the node identifier and the one or more settlement currency types in a storage device.

In certain embodiments according to the present disclosure, the virtual currency settlement method for the cryptocurrency mining pool system further includes: in response to two or more settlement currency types being acquired, determining a priority rank of the at least two settlement currency types; and identifying a settlement currency type according to the priority rank of the two or more settlement currency types.

According to another aspect of the present disclosure, a virtual currency settlement method for an exchange institution is provided. The method includes: receiving a transaction request from a cryptocurrency mining pool system, where the transaction request includes at least an assigned settlement currency type and an amount of a first virtual currency; identifying a transaction partner according to the transaction request; transmitting a transaction confirmation command to the cryptocurrency mining pool system; receiving the amount of the first virtual currency from the cryptocurrency mining pool system; transferring the amount of the first virtual currency to the transaction partner; receiving the amount of the second virtual currency sent by the transaction partner; and transferring the amount of the second virtual currency to the cryptocurrency mining pool system.

According to another aspect of the present disclosure, a virtual currency settlement method for a transaction partner is provided. The method includes: receiving an amount of a first virtual currency sent by an exchange institution; determining an amount of a second currency according to the amount of the first virtual currency, where the amount of the second virtual currency has a same monetary value as the amount of the first virtual currency; and transferring the amount of the second virtual currency to the exchange institution.

According to another aspect of the present disclosure, a virtual currency settlement apparatus for a cryptocurrency mining pool system is provided. The apparatus includes: a settlement module configured to settle with a mining node that acquired a first virtual currency according to a workload performed by the mining node and an income type of the mining node; a transaction module configured to perform a transaction with an exchange institution to exchange an amount in the first virtual currency into an amount in a second virtual currency according to a settlement currency type, where the second virtual currency is the settlement currency type; and a transfer module configured to transfer the amount of the second virtual currency to an account.

In certain embodiments, the transaction module includes: a message transmission submodule configured to access the exchange institution, send a transaction request to the exchange institution, and receive a transaction confirmation command from the exchange institution; a currency transfer submodule configured to transfer the amount of the first virtual currency to the exchange institution; and a receiving submodule configured to receive the amount of the second virtual currency from the exchange institution.

In certain embodiments, the virtual currency settlement apparatus for the cryptocurrency mining pool system further includes: an exchange-rate determining module configured to determining an exchange rate between the first virtual currency and the second virtual currency; and an exchange-rate transmission module configured to send the exchange rate to the mining node.

In certain embodiments, the virtual currency settlement apparatus for the cryptocurrency mining pool system further includes: an acquisition module configured to acquire a node identifier associated with the mining node and one or more settlement currency types; and a storage module configured to store the node identifier and the one or more settlement currency types in a storage device.

In certain embodiments, the virtual currency settlement apparatus for the cryptocurrency mining pool system further includes a priority-rank determining module configured to: if two or more settlement currency types are acquired, determine a priority rank of the two or more settlement currency types; and identify an assigned settlement currency type according to the priority rank of the two or more settlement currency types.

According to another aspect of the present disclosure, a virtual currency settlement apparatus for an exchange institution is provided. The apparatus includes: a request receiving module configured receive a transaction request from a cryptocurrency mining pool system, where the transaction request includes at least a settlement currency type and an amount in a first virtual currency; a command transmitting module configured to identify a transaction partner according to the transaction request, and transmit a transaction confirmation command to the cryptocurrency mining pool system; and a currency receiving module configured to receive the amount of the first virtual currency from the cryptocurrency mining pool system, transfer the amount of the first virtual currency to the transaction partner, receive an amount of a second virtual currency sent by the transaction partner, and transfer the amount of the second virtual currency to the cryptocurrency mining pool system.

According to another aspect of the present disclosure, a virtual currency settlement apparatus for a transaction partner is provided. The apparatus includes: a receiving module configured to receive an amount of a first virtual currency sent by an exchange institution; a determining module configured to determine an amount in a second virtual currency according to the amount in the first virtual currency, where the amount of the second virtual currency has a same monetary value as the amount of the first virtual currency; and a transmitting module configured to transfer the second virtual currency to the exchange institution.

According to another aspect of the present disclosure, a virtual currency settlement apparatus for a cryptocurrency mining pool system is provided. The apparatus includes: a memory storing one or more computer programs; and a processor coupled to the memory and configured to perform: making a settlement with a mining node to acquire an amount of a first virtual currency according to a workload performed by the mining node and an income type of the mining node; according to a settlement currency type, transacting with an exchange institution to exchange the amount of the first virtual currency into an amount of a second virtual currency, where the second virtual currency is the settlement currency type; and transferring the amount of the second virtual currency to an account.

In certain embodiments, the processor is further configured to perform: sending a transaction request to the exchange institution, where the transaction request including at least the settlement currency type and the amount in the first virtual currency; receiving a transaction confirmation command from the exchange institution; transferring the amount of the first virtual currency to the exchange institution; and receiving the amount of the second virtual currency from the exchange institution.

In certain embodiments, after transferring the amount of the second virtual currency to the account, the processor is further configured to perform: determining an exchange rate between the first virtual currency and the second virtual currency; and sending the exchange rate to the mining node, the mining node presenting the exchange rate.

According to another aspect of the present disclosure, the processor is further configured to perform: detecting the mining node accessing the cryptocurrency mining pool system; acquiring a node identifier associated with the mining node; acquiring one or more settlement currency types; and storing the node identifier and the one or more settlement currency types in a storage device.

According to another aspect of the present disclosure, a currency settlement apparatus for an exchange institution is provided. The apparatus includes: a memory storing one or more computer programs; and a processor coupled to the memory and configured to perform: receiving a transaction request from a cryptocurrency mining pool system, the transaction request including at least a settlement currency type and an amount in a first virtual currency; identifying a transaction partner according to the transaction request; transmitting a transaction confirmation command to the cryptocurrency mining pool system; receiving the amount of the first virtual currency from the cryptocurrency mining pool system; transferring the amount of the first virtual currency to the transaction partner; receiving the amount of the second virtual currency sent by the transaction partner; and transferring the amount of the second virtual currency to the cryptocurrency mining pool system.

According to another aspect of the present disclosure, a currency settlement apparatus for a transaction partner is provided. The apparatus includes: a memory storing one or more computer programs; and a processor coupled to the memory and configured to perform: receiving an amount of a first virtual currency sent by an exchange institution; determining an amount of in a second virtual currency according to the amount of the first virtual currency, where the amount of the second virtual currency has a same monetary value as the amount of the first virtual currency; and transferring the amount of the second virtual currency to the exchange institution.

The forgoing general description and the following detailed description are intended to be illustrative and not restrictive.

BRIEF DESCRIPTION OF THE DRAWINGS

In order to more clearly illustrate the technical solutions in the embodiments of the present disclosure, the drawings used in the description of the embodiments will be briefly described below.

DETAILED DESCRIPTION

Technical solutions of the present disclosure will be described with reference to the accompanying drawings. Unless otherwise indicated, the same numerical referrals in different drawings refer to the same or similar elements. Implementations of the following exemplary embodiments described herein are not limiting. Instead, they are merely examples of devices and methods consistent with aspects of the present disclosure. Other embodiments derived by those with ordinary skills in the art according to the described embodiments without inventive efforts shall fall within the scope of the present disclosure.

A virtual currency such as Bitcoin may be considered as a virtual "token" in transactions, representing ledger entries internal to the data sharing system. The blockchain technology may be used to store an online ledger of all the transactions that have ever been conducted using a certain virtual currency, providing a data structure for this ledger that can be copied across all computers in the data sharing network. Certain virtual currencies, such as the cryptocurrency Bitcoin, may be transferred between two parties in a transaction without the need for a third party such as a bank.

Figure 2A:
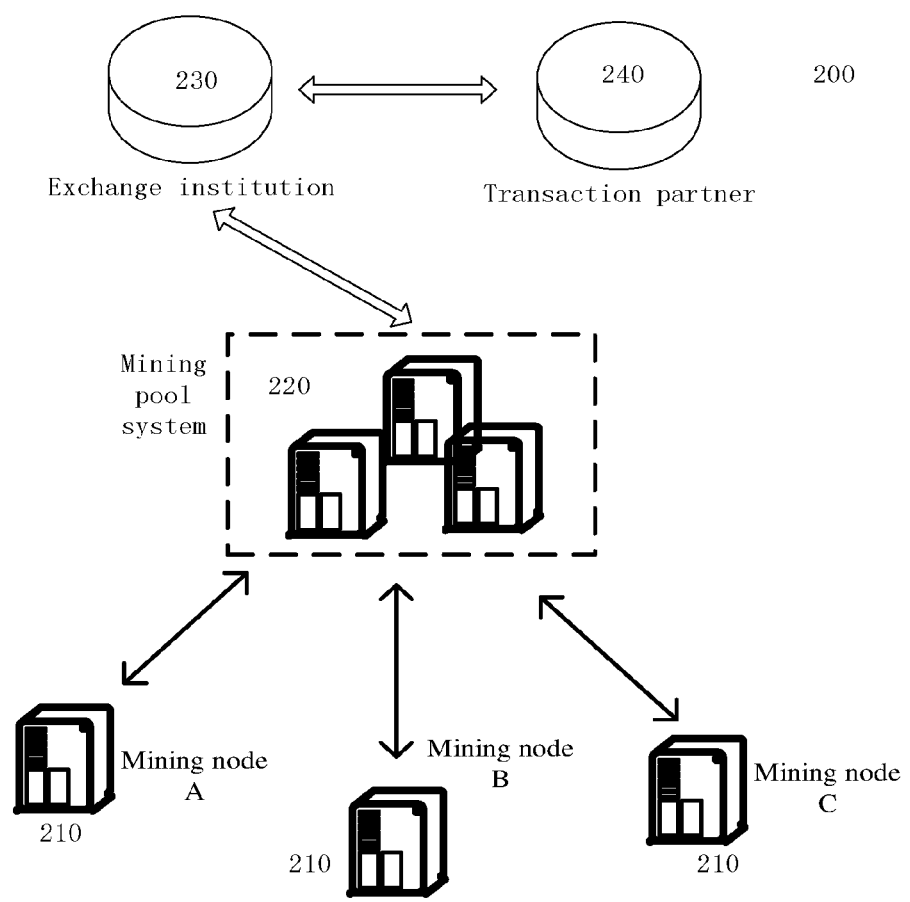
FIG. 2A is a schematic diagram of a virtual currency settlement system according to an exemplary embodiment.

Referring to the virtual currency settlement system shown in FIG. 2A, the virtual currency settlement system refers to a system for settling workload of a mining node, and the virtual currency settlement system may include a plurality of mining nodes, a cryptocurrency mining pool system, an exchange institution, and a transaction partner. The mining node is a computing device operated by a user, and the user performs various operations on the mining node to generate a workload. The cryptocurrency mining pool system makes virtual currency settlements with a plurality of mining nodes according to the workload of the mining nodes. The cryptocurrency mining pool system determines how much income a mining node earns in previous work, and issues the income to the mining node in the form of virtual currency. The transfers may be facilitated through the use of public keys and private keys through a computer network, and thus, no physical copies of the currency are needed. In certain embodiments, a user's account address (sometimes referred to as a digital wallet) is associated with the public key. A private key may be created through a complicated mathematical algorithm that is difficult to reverse. A user's account address, relevant public keys or private keys are stored in computer readable medium, and can be retrieved by various computers in the mining pool system and by the computers involved in the virtual currency settlement process. The digital wallet may store the private key of a user. When a transaction is initiated, the wallet software creates a digital signature by processing the transaction with the private key. If a user wishes to receive the mining node income in a different virtual currency, the exchange institution may provide the exchange service for the cryptocurrency mining pool system. The exchange institution may be an exchange brokerage with an E-business platform or a C2C (Customer to Customer) platform. During the exchange, virtual currency may be digitally sent to a user's or a transaction partner's cryptocurrency wallet, or to the mining pool system's ledger, or may be converted to a digital currency balance that can be deposited to a prepaid card. Since different users may desire to make the settlement based on different virtual currencies, the cryptocurrency mining pool system needs to issue transaction service request to the exchange institution, requesting the exchange institution to sell the virtual currency to a corresponding transaction partner in exchange for a currency having the same type as the settlement currency type set by the user. The transaction partner serves as the medium designated by the exchange institution for exchanging virtual currency for the settlement virtual currency. The transaction partner may be a clearing house or an individual or an entity having electronic access to the platform of the exchange institution. When the exchange institution receives the transaction request sent by the cryptocurrency mining pool system, it identifies the transaction partner that can perform the exchange with according to the settlement currency type and the amount in the virtual currency that needs to be exchanged according to the transaction request. The exchange institution then performs the virtual currency exchange with the transaction partner, so that the settlement can be made in the settlement currency type set by the user, eliminating the need for the cryptocurrency mining pool system to manage multiple types of virtual currencies.

Further, in the embodiments of the present disclosure, embodiments of the present disclosure provide flexibility and convenience for the users of the mining node, offering them options of receiving the mining node income as a virtual currency more universally used, so that the users do not need to perform a separate step to exchange the first virtual into another virtual currency. In a related aspect, in embodiments of the present disclosure, since the exchange may be conducted automatically from the user's perspective, the settlement may be performed in a frequency that the user wishes. The user no longer needs to wait a long period for a settlement to take place, instead, the user may request settlement at a particular moment in real time. For example, the user may request settlement before, after, or during the process when a mining node is performing a certain task, and the settlement may reflect the work completed by the mining node in real time by providing the user with credit of partially completed tasks.

The forgoing virtual currency settlement system can be applied to a data sharing system. A data sharing system refers to a system for sharing data between nodes. The data sharing system may include a plurality of nodes, and the mining nodes may generate income by recording data for a plurality of nodes in the data sharing system.

Figure 1A:
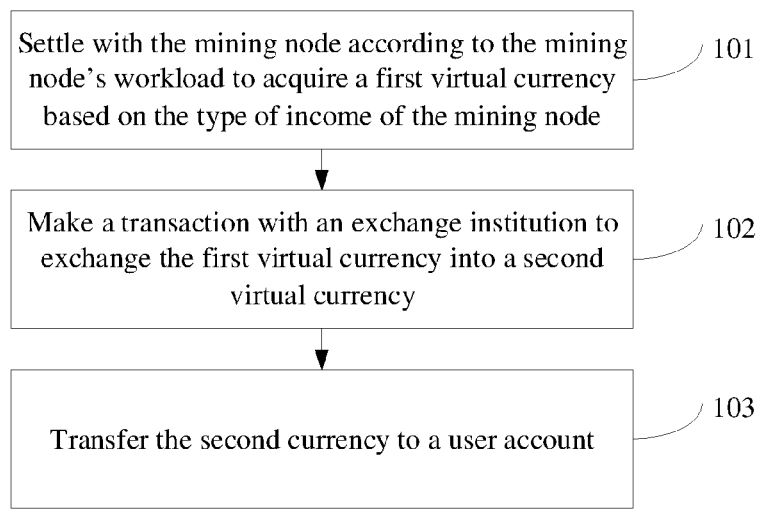
FIG. 1A is a flowchart of a virtual currency settlement method according to an exemplary embodiment.

FIG. 1A is a flow chart showing a method of virtual currency settlement according to an exemplary embodiment. As shown in FIG. 1A, the method may be applied to a cryptocurrency mining pool system, and the method may include the following steps.

In step 101, the cryptocurrency mining pool system settles with a mining node according to the mining node's workload to acquire a first virtual currency based on the type of income of the mining node.

In certain embodiments, the workload of the mining node may be associated with the amount of hash calculations the mining node performs in a period of time by the settlement. Both the mining pool systems and the mining node may keep track of the workload. The settlement may take place at a schedule pre-determined by the mining pool system, by the user of the mining node, or triggered in real time by an external event trigger such as a status change of another mining node, or a status change of the mining pool. For example, the settlement process may monitor the status of the mining nodes in a mining pool, and may initiate the settlement process automatically based on the status changes of one or more mining nodes. Once triggered, the settlement process may be carried out without any further user or operator actions. In some embodiment, the user may submit a request for settlement through a user interface.

In step 102, according to the settlement currency type selected by the user, the cryptocurrency mining pool system makes a transaction with an exchange institution to exchange the first virtual currency into a second virtual currency. The second virtual currency has the same currency type as the settlement currency type, and has equal monetary value as the first virtual currency.

In step 103, the cryptocurrency mining pool system transfers the second virtual currency to the user's account, and completes the virtual currency settlement.

In certain embodiments, the cryptocurrency mining pool system settles with a mining node according to the mining node's workload to acquire the first virtual currency based on the type of income of the mining node earns. Then the cryptocurrency mining pool system makes a transaction with an exchange institution to exchange the first virtual currency into a second virtual currency according to the settlement currency type selected by the user, and transfers the second virtual currency to the user's account. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

In certain embodiments, prior to settling with the mining node according to its workload based on the type of income of the mining node, the method may further include the following steps.

When detecting that a mining node is accessing the cryptocurrency mining pool system, the mining pool system acquires a node identifier of the mining node and a settlement currency type selected by the user; and the mining pool system stores the node identifier of the mining node with the corresponding settlement currency type in a storage device.

In certain embodiments, the transacting with an exchange institution to exchange the first virtual currency into the second virtual currency according to the settlement currency type selected by the user may include the following steps.

The cryptocurrency mining pool system accesses the exchange institution and submits a transaction request to the exchange institution, so that the exchange institution may identify a transaction partner according to the transaction request. The transaction request includes at least the amount in the first virtual currency and the settlement currency type.

After receiving a transaction confirmation command sent by the exchange institution after the transaction partner is identified, the cryptocurrency mining pool system sends the first virtual currency to the exchange institution, so that the exchange institution may send the first virtual currency to the transaction partner. After receiving the first virtual currency, the transaction partner sends the second virtual currency to the exchange institution. The cryptocurrency mining pool system receives the second virtual currency sent by the exchange institution.

In certain embodiments, after transferring the second virtual currency to the user account and finalizing the virtual currency settlement, the method may further include the following steps.

According to the currency types of the first virtual currency and the second virtual currency, the cryptocurrency mining pool system may determine the settlement exchange rate between the virtual currency and the second virtual currency, and transmit the settlement exchange rate to the mining node, so that the mining node may present the exchange rate to the user.

In certain embodiments, the method may further include the following steps.

If the user selected two or more settlement currency types, the cryptocurrency mining pool system determines a priority rank for each of settlement currency types; and exchanges the first virtual currency into the second virtual currency according to the settlement currency type that ranks at the top.

All of the forgoing technical solutions can be implemented in conjunction with any optional form of embodiments of the present disclosure, which is not repeated.

Figure 1B:
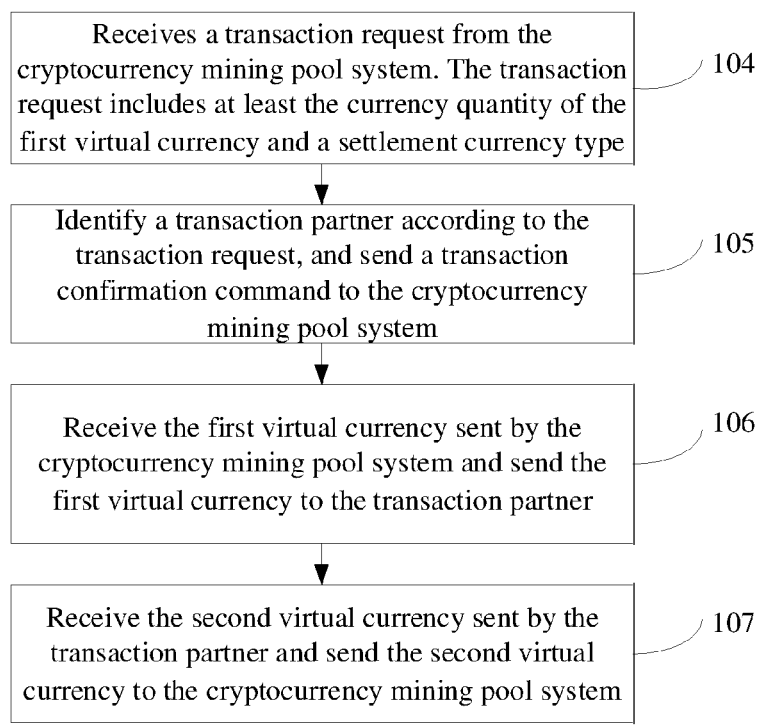
FIG. 1B is a flowchart of a virtual currency settlement method according to an exemplary embodiment.

FIG. 1B is a flowchart of a virtual currency settlement method according to an exemplary embodiment. As shown in FIG. 1B, the method is applied to an exchange institution, and the method includes the following steps.

In step 104, the exchange institution receives a transaction request from the cryptocurrency mining pool system. The transaction request includes at least the amount in the first virtual currency and the settlement currency type. The first virtual currency has been acquired by settling with the mining node according to its workload and income type.

In step 105, the exchange institution identifies a transaction partner according to the transaction request, and sends a transaction confirmation command to the cryptocurrency mining pool system, so that the cryptocurrency mining pool system may send the first virtual currency to the exchange institution upon receiving the transaction confirmation command.

In step 106, the exchange institution receives the first virtual currency sent by the cryptocurrency mining pool system and sends the first virtual currency to the transaction partner. After the transaction partner receives the first virtual currency, the transaction partner sends the second virtual currency to the exchange institution. The second virtual currency has the same currency type as the settlement currency type and equal monetary value as the first virtual currency.

In step 107, the exchange institution receives the second virtual currency sent by the transaction partner and sends the second virtual currency to the cryptocurrency mining pool system, so that the cryptocurrency mining pool system may perform currency settlement with the mining node based on the second virtual currency.

In the forgoing embodiment provided by the present disclosure, the exchange institution receives the transaction request sent by the cryptocurrency mining pool system, identifies a transaction partner according to the transaction request, and sends a transaction confirmation command to the cryptocurrency mining pool system, so that after receiving the transaction confirmation command, the cryptocurrency mining pool system may send the first virtual currency to the exchange institution. After receiving the first virtual currency sent by the cryptocurrency mining pool system, the exchange institution sends the first virtual currency to the transaction partner, so that the transaction partner may send the second virtual currency to the exchange institution after receiving the virtual currency. After receiving the second virtual currency sent by the transaction partner, the exchange institution sends the second virtual currency to the cryptocurrency mining pool system, so that the cryptocurrency mining pool system may perform currency settlement with the mining node based on the second virtual currency. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

Figure 1C:
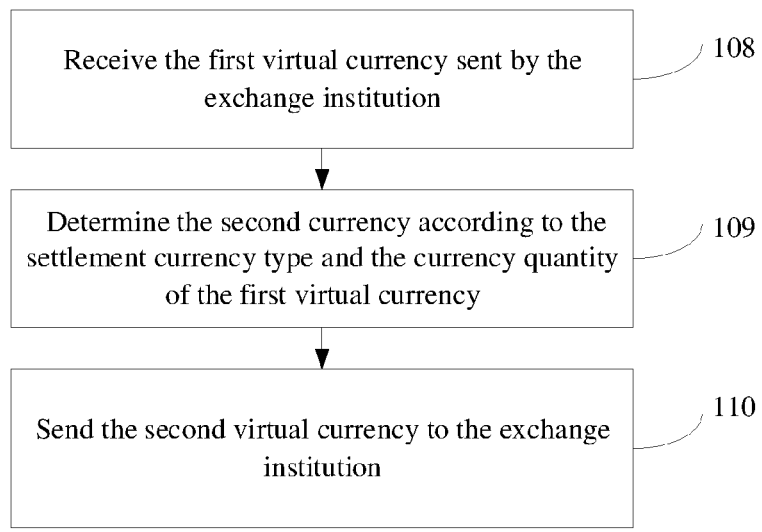
FIG. 1C is a flowchart of a virtual currency settlement method according to an exemplary embodiment.

FIG. 1C is a flowchart of a virtual currency settlement method according to an exemplary embodiment. As shown in FIG. 1C, the method is applied to a transaction partner, and the method includes the following steps.

In step 108, the transaction partner receives the first virtual currency sent by the exchange institution, wherein the first virtual currency has been acquired by settling with the mining node according to its workload and income type.

In step 109, according to the amount in the first virtual currency, the transaction partner determines the amount of second virtual currency. The second virtual currency has the same currency type as the settlement currency type and equal monetary value as the first virtual currency.

In step 110, the transaction partner sends the second virtual currency to the exchange institution, so that the exchange institution may send the second virtual currency to the cryptocurrency mining pool system.

In the forgoing embodiment, the transaction partner receives the first virtual currency sent by the exchange institution, determines the amount of second virtual currency according to the amount in the virtual currency, and sends the second virtual currency to the exchange institution, so that the exchange institution may send the second virtual currency to the cryptocurrency mining pool system. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

Figure 2B:
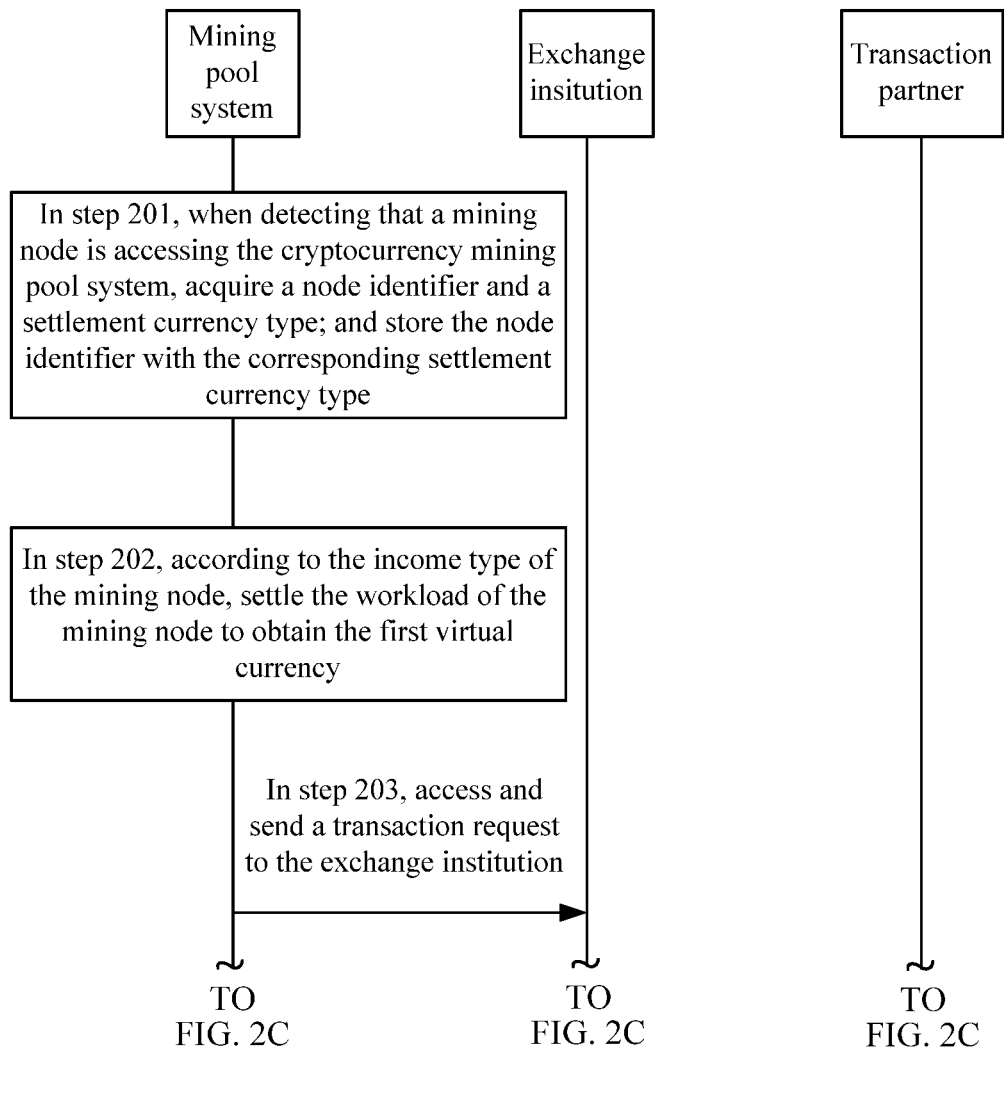
FIG. 2B-FIG. 2D are flowcharts of a virtual currency settlement method according to an exemplary embodiment.
Figure 2C:
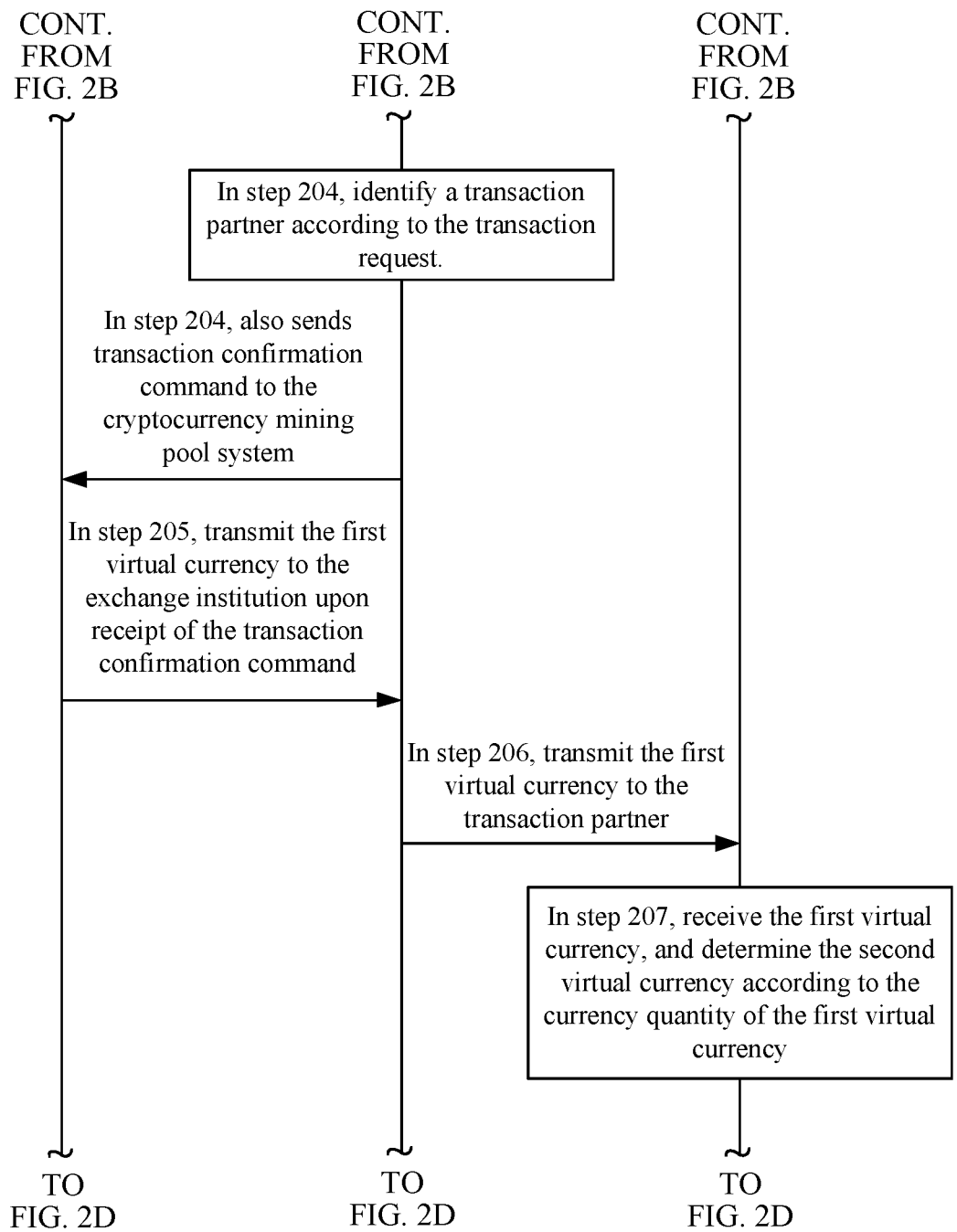
Figure 2D:
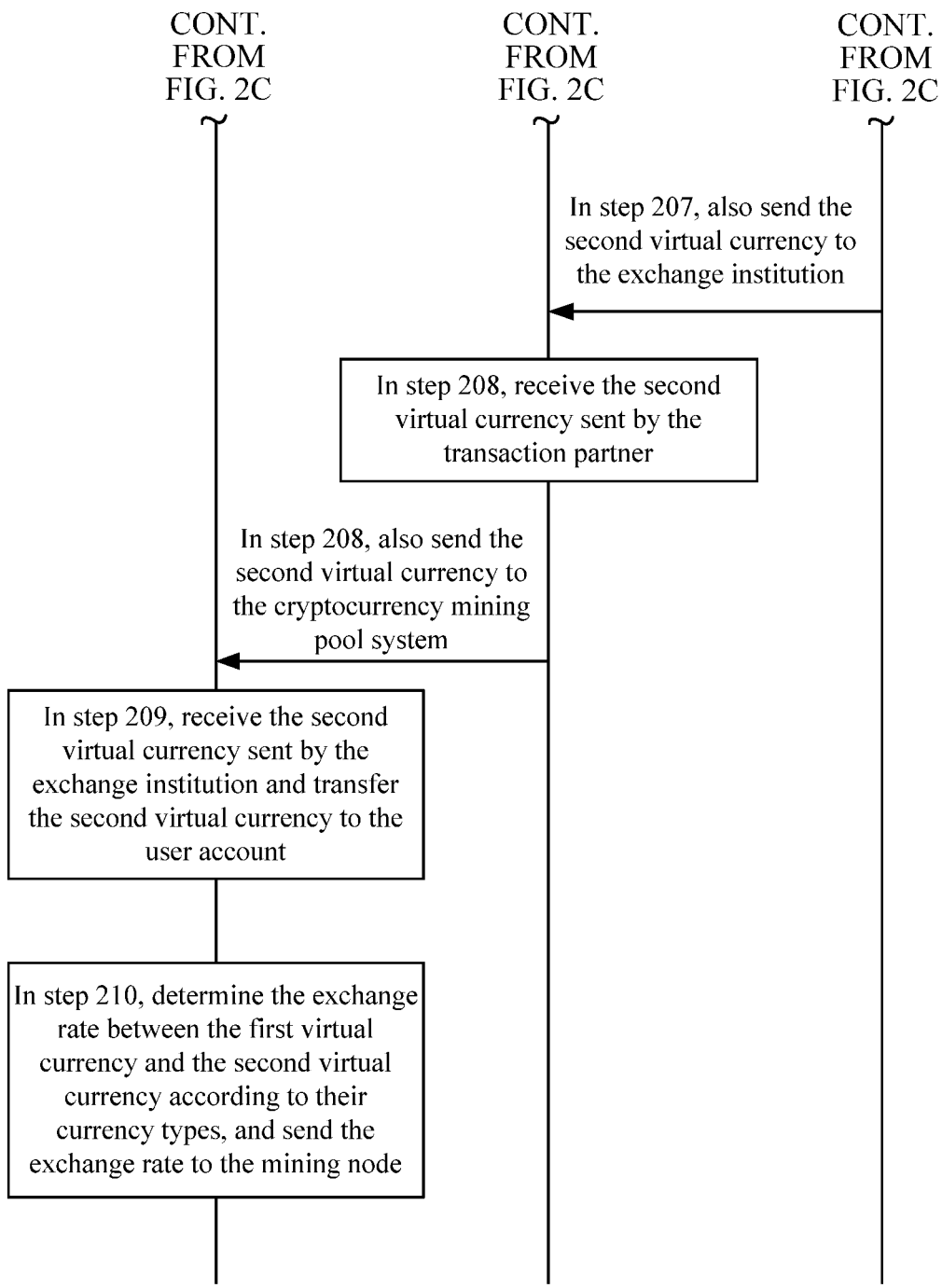

FIG. 2B-FIG. 2D are flow charts showing a method of virtual currency settlement according to an exemplary embodiment. As shown in FIG. 2B-FIG. 2D, the method may include the following steps.

In step 201, when detecting that a mining node is accessing the cryptocurrency mining pool system, the mining pool system acquires a node identifier of the mining node and a settlement currency type selected by the user; and the mining pool system stores the node identifier of the mining node with the corresponding settlement currency type.

For the user of the mining node, in order to facilitate the management of the virtual currency, the type of the virtual currency that the user wishes to obtain is fixed when the virtual currency settlement is performed. For the mining node, the type of income is related to the type of workload the mining node performs, that is, the type of income the mining node generates is the same as the type of workload the mining node performs.

In order to enable the user to obtain the same type of virtual currency at each settlement, thereby reducing the threshold of the mining node accessing the mining pool system, when the mining system detects that the mining node is accessing the mining pool system, it may provide a settlement currency type selection service, so that the user may select a currency type for settlement.

After the mining node is connected to the cryptocurrency mining pool system, the terminal held by the user for controlling the mining node may display the interface for the settlement currency type selection. When the terminal detects that the user triggers the settlement currency type selection interface, it may display a plurality of settlement currency types, and when it is detected that the user confirms that a certain currency type is selected as the settlement currency, the settlement currency type is sent to the mining pool system. After receiving the settlement currency type set by the user, the mining pool system stores the settlement currency type corresponding to the node identifier of the mining machine node, so that when the virtual currency settlement is subsequently performed for the mining node, the mining pool system may decide which type of virtual currency to be used for settlement. Further, when the mining pool system provides the settlement currency type configuration service for the user, when the control terminal detects that the user triggers the settlement currency type selection, the system may display an input box for settlement currency type, so that the user may enter the settlement currency type.

In certain embodiments, the user interface on the user's terminal may be further configured for the user to communicate with the mining pool system or to set up preference parameters. For example, the user may use the interface to send a request for a settlement in real time, or set a time schedule for multiple settlements. When a transaction confirmation is received, the available transaction partner may be presented to the user via the user interface, and the user may approve or reject a particular transaction. Alternatively, the user may configure automatic approvals, rejections, or holding for user review via the user interface based on certain criteria, for example, the real-time exchange rate between the two virtual currencies, the amount to be exchanged, and certain transaction partners, and so on. In certain embodiments, the user interface may also be used to display and interact with the operation and exchange progress of multiple mining nodes.

When storing the settlement currency type with the corresponding node identifier of the mining node, the cryptocurrency mining pool system may generate a settlement currency type list as shown in Table 1. Table 1 shows an exemplary format of the settlement currency type storage. The present disclosure does not specifically limit the manner in which the cryptocurrency mining pool system stores the settlement currency types.

TABLE 1

| Node identifier | Settlement currency type |
|---|---|
| Mining node A | Currency type 1 |
| Mining node B | Currency type 2 |
| . . . | . . . |

In certain circumstances, the settlement process may be unsuccessful when the mining pool system attempts to make settlement based on a specific type of virtual currency, that is, the virtual currency settlement cannot be performed normally based on the settlement currency type selected by the user in certain circumstances. The settlement currency type configuration service may also allow users to select multiple settlement currencies, and request the user to set priorities for the multiple types settlement currencies. Thus, at the time of making virtual currency settlement, if the mining pool system is unable to make the settlement is based on the type of virtual currency with the highest priority rank, the virtual currency settlement may be performed based on the settlement currency type of the next priority rank. The present disclosure does not specifically limit the number of settlement currency types provided by the mining pool system for the users.

In step 202, according to the income type of the mining node, the cryptocurrency mining pool system settles the workload of the mining node to obtain the first virtual currency.

In certain embodiments of the present disclosure, the type of the first virtual currency is consistent with the income type of the mining node. For the mining node, if the user sets up the mining node to perform a certain work, after the mining node completes the work, the cryptocurrency mining pool system first makes the virtual currency settlement using the type of currency according to the type of the income generated by the mining node that performed the work. For example, if the mining node is presently configured by the user to mine bitcoins, the income generated by the mining node in the process of the work is bitcoin. When the cryptocurrency mining pool system makes the settlement according to the workload the mining node performs, the obtained virtual currency is bitcoin.

In step 203, the cryptocurrency mining pool system accesses the exchange institution and sends a transaction request to the exchange institution. The transaction request includes at least the amount in the first virtual currency and the settlement currency type.

In certain embodiments, the exchange institution provides a virtual currency transaction service for the cryptocurrency mining pool system, so that the cryptocurrency mining pool system may obtain second virtual currency having the monetary value equal to the first virtual currency. The exchange institution may be an exchange brokerage or a C2C (Customer to Customer) platform. When the cryptocurrency mining pool system needs to exchange the first virtual currency into the virtual currency with the settlement currency type, it may access the exchange institution and send a transaction request carrying the settlement currency type and the amount in the first virtual currency to the exchange institution, so that the exchange institution may identify a transaction partner according to the settlement currency type and the amount in the first virtual currency to perform the exchange. The cryptocurrency mining pool system may be connected to the exchange institution during system initiation, and maintain the connection with the exchange institution during the exchange process. Alternatively, the cryptocurrency mining pool system may access the exchange institution when the virtual currency needs to be settled, and after successfully exchanging the first virtual currency into the virtual currency with the settlement currency type, the connection with the exchange institution may be disconnected. The present disclosure does not specifically limit the timing and manner of the cryptocurrency mining pool system's accessing to the exchange institution.

In certain instances, due to a limited size of certain exchange institution, the exchange institution may not be able to meet the transaction request sent by the cryptocurrency mining pool system. The cryptocurrency mining pool system may access multiple exchange institutions. When the cryptocurrency mining pool system needs to exchange the first virtual currency into a virtual currency with the settlement currency type, the cryptocurrency mining pool system may send transaction requests to multiple exchange institutions, so that the multiple exchange institutions determine whether there is a transaction partner available, and the cryptocurrency mining pool system may conduct the exchange transaction with the exchange institution from which the cryptocurrency mining pool system receives the transaction confirmation command first. The present disclosure does not specifically limit the number of the exchange institutions that the cryptocurrency mining pool system accesses.

Further, when the user sets two or more settlement currency types, the mining pool system first acquires the two or more settlement currency types and their corresponding priorities set by the user before sending the transaction request to the exchange institution. Next, the transaction request is generated based on the settlement currency type for which the priority is ranked highest. If the user only sets one settlement currency type, the mining pool system may directly acquire the settlement currency type, and generate a transaction request carrying the settlement currency type and the amount in the first virtual currency, and send the transaction request to the exchange institution.

In step 204, the exchange institution identifies a transaction partner according to the transaction request, and sends a transaction confirmation command to the cryptocurrency mining pool system.

In certain embodiments, after the exchange institution receives the transaction request sent by the cryptocurrency mining pool system, the exchange institution extracts the settlement currency type and the amount in the virtual currency from the transaction request, identifies the transaction partner that is available to be exchanged with according to the currency type and currency quantity, and sends a transaction confirmation command to the cryptocurrency mining pool system. In certain embodiments, the exchange institution may add a transaction partner identifier in the transaction confirmation command when sending the transaction confirmation command to the cryptocurrency mining pool system to clarify the information on the transaction partner to the cryptocurrency mining pool system.

In order to facilitate the exchange institution to identify the corresponding transaction partner according to the settlement currency type and the currency quantity, the transaction partner may display the presently requested settlement currency type and the currency quantity to the exchange institution. For example, suppose that presently exist transaction partners A and B. Transaction Partner A may accept currency type 1 and currency type 2, and may pay in currency type 3, and the currency quantity A needs may be 3000; Transaction Partner B may accept currency type 3 and currency type 4, and may pay in currency type 5, and the currency quantity B needs may be 2000. If the transaction request that exchange institution received carries a settlement currency type of 3, and an amount of 1000, the exchange institution may select A as the transaction partner, and send a transaction confirmation command to the cryptocurrency mining pool system.

In step 205, the cryptocurrency mining pool system sends the first virtual currency to the exchange institution upon receipt of the transaction confirmation command sent by the exchange institution.

In certain embodiments, when the cryptocurrency mining pool system receives the transaction confirmation command sent by the exchange institution after it identifies the transaction partner, the cryptocurrency mining pool system may determine that the first virtual currency can be presently exchanged, and send the first virtual currency to the exchange institution. The exchange institution then may send the first virtual currency to the transaction partner, receive a second virtual currency with a currency type as the settlement currency type, and then send the second virtual currency to the cryptocurrency mining pool system.

In step 206, the exchange institution sends the first virtual currency to the transaction partner.

In certain embodiments, after the exchange institution receives the first virtual currency sent by the cryptocurrency mining pool system, the exchange institution may determine that the cryptocurrency mining pool system presently confirms the transaction with the transaction partner. The exchange institution then may send the first virtual currency to the transaction partner, so that the transaction partner may return the second virtual currency with the same currency type as the settlement currency type and equal monetary value as the first virtual currency.

For a transaction partner, there may be multiple currency types it may make payments in, that is, after receiving the first virtual currency, there may be multiple currency types the transaction partner may be able to exchange the first virtual currency into. In order for the transaction partner to return the same currency type as the settlement currency type, when the exchange institution sends the first virtual currency to the transaction partner, the exchange institution may also send the settlement currency type to the transaction partner, so that the transaction partner may return the virtual currency with the same currency type as the settlement currency type.

In step 207, the transaction partner receives the first virtual currency sent by the exchange institution, determines the amount of second virtual currency according to the amount in the first virtual currency, and sends the second virtual currency to the exchange institution. The second virtual currency has the same currency type as the settlement currency type and equal monetary value as the first virtual currency.

In certain embodiments, after receiving the first virtual currency sent by the exchange institution, the transaction partner may first determine the amount in the first virtual currency, and then determine the amount of second virtual currency with the same currency type as the settlement currency type and equal monetary value as the first virtual currency. The transaction partner then may send the second virtual currency to the exchange institution, so that the exchange institution may return the second virtual currency to the cryptocurrency mining pool system.

In certain embodiments, if the currency type that the transaction partner may make payment in is only one type, then the currency type of the second virtual currency determined by the transaction partner may be the currency supported by the transaction partner; if the transaction partner may make payments in a plurality of currency types, then the transaction partner may determine the settlement currency type sent by the mining pool system as the currency type of the second virtual currency. The present disclosure does not specifically limit the manner in which the transaction partner determines the currency type of the second virtual currency.

In step 208, the exchange institution receives the second virtual currency sent by the transaction partner and sends the second virtual currency to the cryptocurrency mining pool system.

In certain embodiments, after the exchange institution receives the second virtual currency sent by the transaction partner, the exchange institution may send the second virtual currency to the cryptocurrency mining pool system, so that the cryptocurrency mining pool system may make settlement with the mining node based on the second virtual currency.

In step 209, the cryptocurrency mining pool system receives the second virtual currency sent by the exchange institution, transfers the second virtual currency to the user account, and completes the virtual currency transaction.

In certain embodiments, after the cryptocurrency mining pool system receives the second virtual currency sent by the exchange institution, the cryptocurrency mining pool system may identify the user account of the mining node, and transfer the second virtual currency to the user account to complete the settlement.

In step 210, the cryptocurrency mining pool system determines the exchange rate between the first virtual currency and the second virtual currency according to the currency types of the first virtual currency and the second virtual currency, and sends the exchange rate to the mining node, so that the mining node may present the exchange rate to the user.

In certain embodiments, since the transaction partner may make an error when determining the amount in the second virtual currency according to settlement currency type and the amount in the first virtual currency, the user may receive an incorrect quantity of the second virtual currency. In order to avoid the forgoing situation, after the cryptocurrency mining pool system transfers the second virtual currency to the user account, the cryptocurrency mining pool system may determine the settlement exchange rate between the first virtual currency and the second virtual currency according to the types of the virtual currencies, and send the settlement exchange rate to the mining node. Thus, the user of the mining node may obtain the settlement exchange rate and make calculation according to the settlement exchange rate to determine whether the received second virtual currency is in the correct quantity. When an incorrect quantity of the second virtual currency is received, the user may appeal to the cryptocurrency mining pool system, so that the cryptocurrency mining pool system may re-settle with the mining node according to the workload.

In certain embodiments, in order to simplify the virtual currency settlement process, step 210 may be omitted, that is, when step 209 is completed, the cryptocurrency mining pool system then determines that the virtual currency settlement is complete.

In certain embodiments, the cryptocurrency mining pool system settles with the mining node according to its workload to acquire the first virtual currency based on the type of income of the mining node. The cryptocurrency mining pool system conducts transactions with the exchange institution according to the settlement currency type selected by the user, so that the first virtual currency is exchanged into a second virtual currency with the same currency type as the settlement currency type, and then transfers the second virtual currency to the user account established by the mining node user. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

Figure 3A:
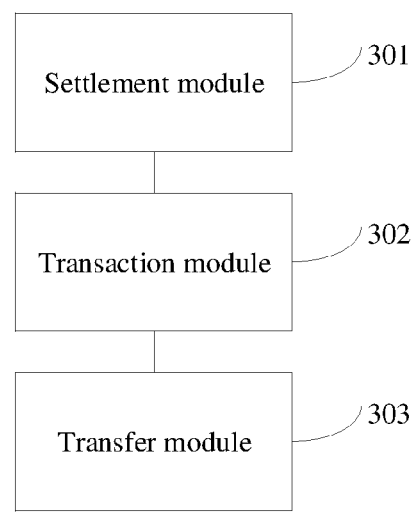
FIG. 3A is a block diagram of a virtual currency settlement apparatus according to an exemplary embodiment.

FIG. 3A is a block diagram of an exemplary embodiment of a virtual currency settlement apparatus for a cryptocurrency mining pool system. Referring to FIG. 3A, the apparatus includes a settlement module 301, a transaction module 302, and a transfer module 303.

The settlement module 301 is configured to settle with the mining node according to its workload to acquire the first virtual currency based on the type of income of the mining node.

The transaction module 302 is configured to conduct a transaction with an exchange institution to exchange the first virtual currency into a second virtual currency according to the settlement currency type. The second virtual currency has the same currency type as the settlement currency type and equal monetary value as the first virtual currency.

The transfer module 303 is configured to transfer the second virtual currency to the user account, and completes the virtual currency transaction.

In certain embodiments, the apparatus provided by the present disclosure may settle with a mining node according to its workload to acquire virtual currency based on the type of income of the mining node. The apparatus may conduct transactions with an exchange institution according to the settlement currency type, so that the virtual currency is exchanged into second virtual currency, and then transfer the second virtual currency to the user account. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

Figure 3B:
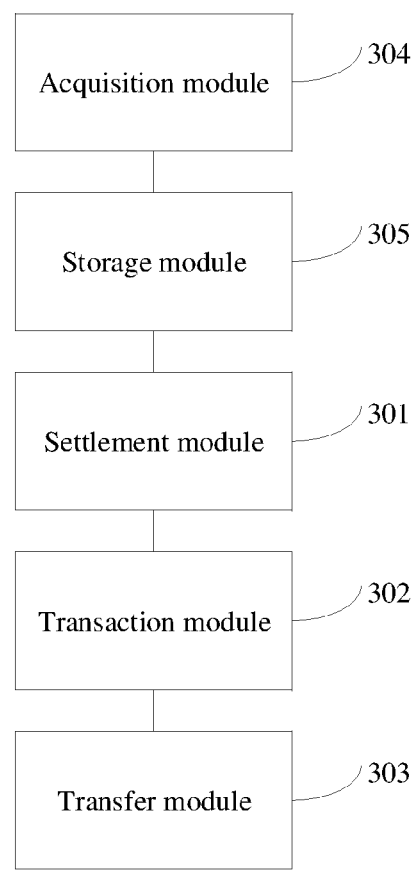
FIG. 3B is a block diagram of a virtual currency settlement apparatus according to an exemplary embodiment.

In another embodiment, referring to FIG. 3B, the apparatus further includes an acquisition module 304 and a storage module 305.

The acquisition module 304 is configured to acquire a node identifier of the mining node and a settlement currency type selected by the user when detecting that a mining node is accessing the cryptocurrency mining pool system.

The storage module 305 is configured to store the node identifier of the mining node and the corresponding settlement currency type.

Figure 3C:
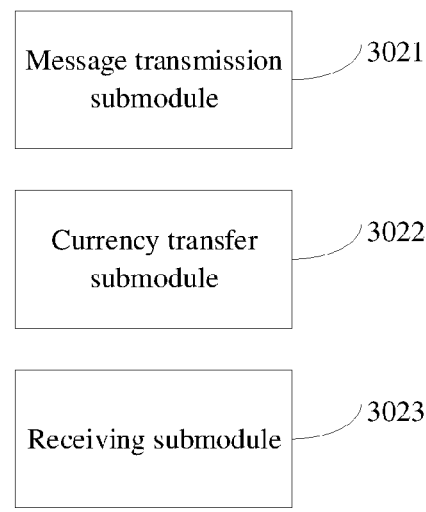
FIG. 3C is a block diagram of a virtual currency settlement apparatus according to an exemplary embodiment.

In certain embodiments, referring to FIG. 3C, the transaction module 302 may include a message transmission submodule 3021, a currency transfer submodule 3022, and a receiving submodule 3023.

The message transmission submodule 3021 is configured to access an exchange institution, and send a transaction request to the exchange institution, so that the exchange institution may identify a transaction partner according to the transaction request. The transaction request includes at least the amount in the first virtual currency and the settlement currency type.

The currency transfer submodule 3022 is configured to: after receiving the transaction confirmation command sent by the exchange institution after it identifies a transaction partner, send the first virtual currency to the exchange institution, so that the exchange institution may send the first virtual currency to the transaction partner, and the transaction partner may send the second virtual currency to the exchange institution after receiving the first virtual currency.

The receiving submodule 3023 is configured to receive second virtual currency sent by the exchange institution.

Figure 3D:
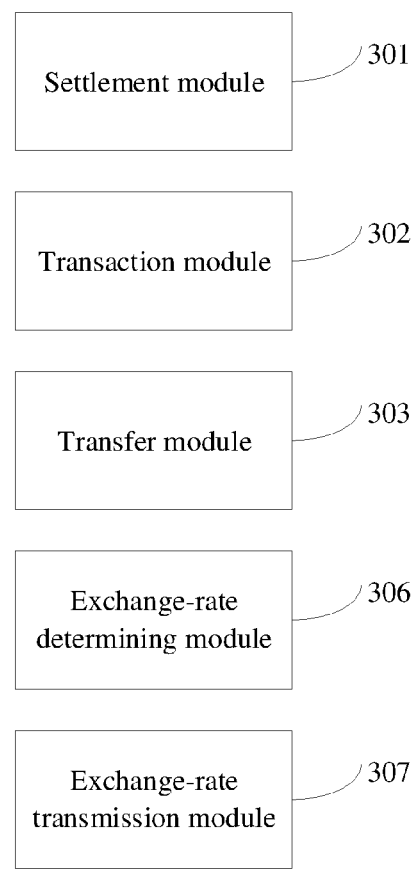
FIG. 3D is a block diagram of a virtual currency settlement apparatus according to an exemplary embodiment.

In certain embodiments, referring to FIG. 3D, the apparatus may further include an exchange-rate determining module 306 and an exchange-rate transmission module 307.

The exchange-rate determining module 306 is configured to determine the exchange rate between the first virtual currency and the second virtual currency according to their currency types.

The exchange-rate transmission module 307 is configured to send the settlement exchange rate to the mining node, so that the mining node may present the settlement exchange rate to the user.

Figure 3E:
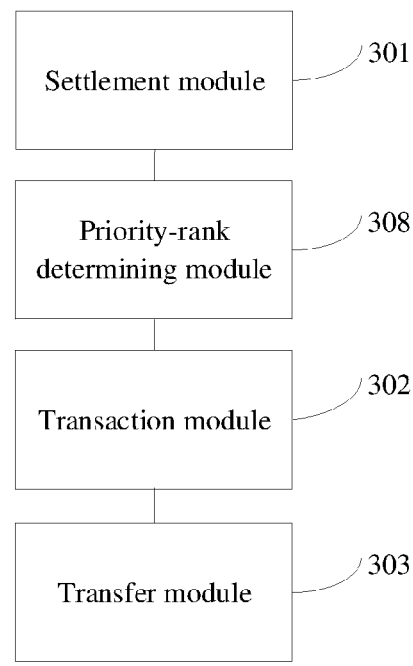
FIG. 3E is a block diagram of a virtual currency settlement apparatus according to an exemplary embodiment.

In certain embodiments, referring to FIG. 3E, the apparatus may further include a priority-rank determining module 308.

The priority-rank determining module 308 is configured to determine the currency type priorities when the user sets two or more settlement currency types.

The transaction module 302 is further configured to exchange the first virtual currency into the second virtual currency according to the settlement currency type for which the priority is ranked highest.

With regard to the apparatus in the forgoing embodiments, the specific manner in which the respective modules perform the operations has been described in detail in the embodiments related to the method, and will not be explained again in detail herein.

Figure 4:
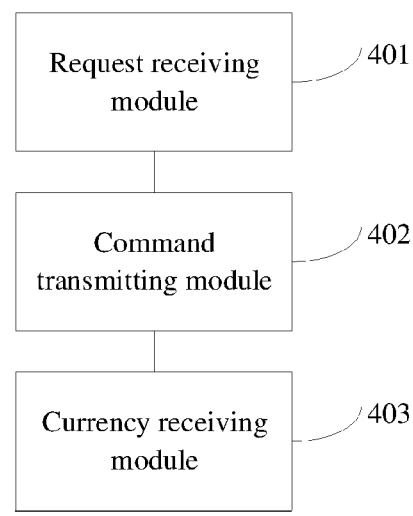
FIG. 4 is a block diagram of a virtual currency settlement apparatus according to an exemplary embodiment.

FIG. 4 is a block diagram of a virtual currency settlement apparatus for an exchange institution according to an exemplary embodiment. Referring to FIG. 4, the apparatus may include a request receiving module 401, a command transmitting module 402, and a currency receiving module 403.

The request receiving module 401 is configured to receive a transaction request sent by the cryptocurrency mining pool system. The transaction request includes at least the amount in the first virtual currency and the settlement currency type. The first virtual currency has been acquired by making a settlement with a mining node according to its workload and income type.

The command transmitting module 402 is configured to send a transaction confirmation command to the cryptocurrency mining pool system according to the identified transaction partner, so that the cryptocurrency mining pool system may send the first virtual currency to the exchange institution after receiving the transaction confirmation command.

The currency receiving module 403 is configured to receive the first virtual currency sent by the cryptocurrency mining pool system, and to send the first virtual currency to the transaction partner, so that after receiving the first virtual currency, the transaction partner may send the second virtual currency to the exchange institution. The second virtual currency has the same currency type as the settlement currency type and equal monetary value as the first virtual currency.

The currency receiving module 403 is further configured to receive the second virtual currency sent by the transaction partner, and to send the second virtual currency to the cryptocurrency mining pool system, so that the cryptocurrency mining pool system may perform virtual currency settlement with the mining node based on the second virtual currency.

According to the apparatus provided by present disclosure, the exchange institution may receive the transaction request sent by the cryptocurrency mining pool system, identify a transaction partner according to the transaction request, and send a transaction confirmation command to the cryptocurrency mining pool system, so that the cryptocurrency mining pool system may receive the transaction confirmation command and send the first virtual currency to the exchange institution. When the first virtual currency sent by the cryptocurrency mining pool system is received, the exchange institution may send the first virtual currency the transaction partner, so that the transaction partner may send the second virtual currency to the exchange institution after receiving the virtual currency. The exchange institution may then send the second virtual currency to the cryptocurrency mining pool system, so that the cryptocurrency mining pool system may perform virtual currency settlement based on the second virtual currency. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

Figure 5:
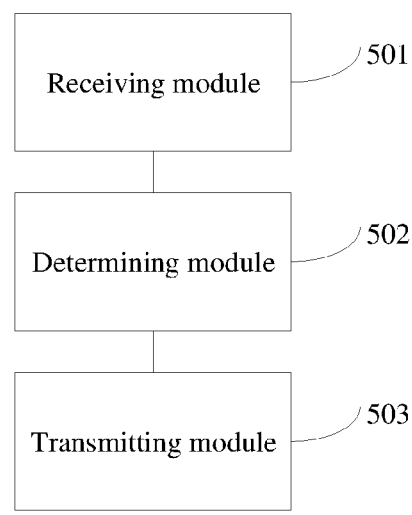
FIG. 5 is a block diagram of a virtual currency settlement apparatus according to an exemplary embodiment.

FIG. 5 is a block diagram of a virtual currency settlement apparatus for a transaction partner according to an exemplary embodiment. Referring to FIG. 5, the apparatus includes a receiving module 501, a determining module 502, and a transmitting module 503.

The receiving module 501 is configured to receive the first virtual currency sent by the exchange institution. The first virtual currency has been generated by the cryptocurrency mining pool system according to the type of income and performed workload of a mining node and sent to the exchange institution.

The determining module 502 is configured to determine the amount of second virtual currency according to the amount in the first virtual currency. The second virtual currency has the same currency type as the settlement currency type and equal monetary value as the first virtual currency.

The transmitting module 503 is configured to send the second virtual currency to the exchange institution, so that the exchange institution may send the second virtual currency to the cryptocurrency mining pool system.

Based on the apparatus provided by the present disclosure, the transaction partner may receive the first virtual currency sent by the exchange institution, determines the amount of second virtual currency quantity according to the amount in the first virtual currency, and sends the second virtual currency to the exchange institution, so that the exchange institution may send the second virtual currency to the cryptocurrency mining pool system. Thus, the mining pool system may make settlements in different virtual currencies by means of transacting with an exchange institution, eliminating the need to manage multiple types of virtual currencies, reducing the settlement workload of the mining pool system, and reducing the research and development costs of the mining pool system.

Figure 6:
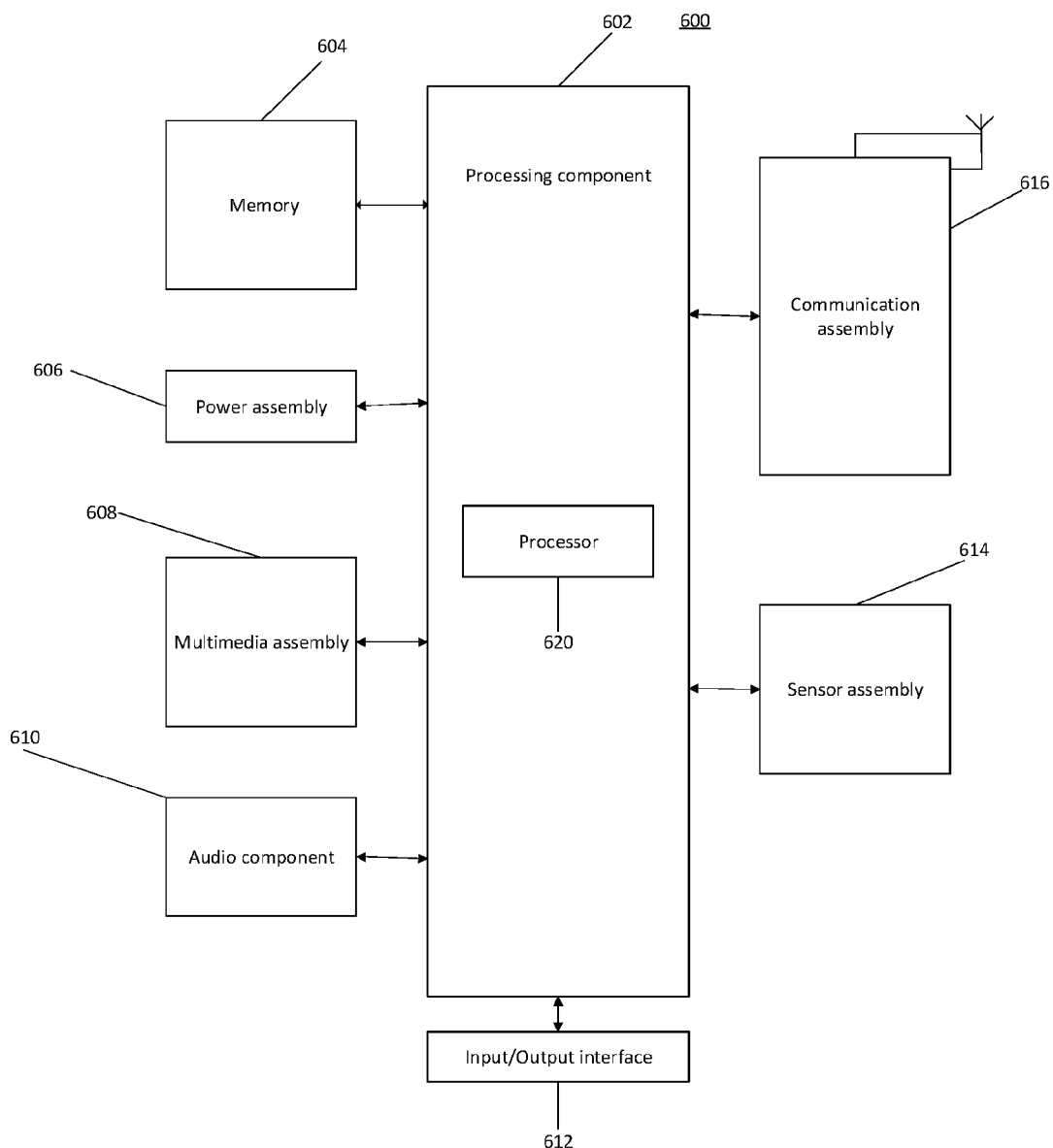
FIG. 6 is a block diagram of a virtual currency settlement apparatus according to an exemplary embodiment.

FIG. 6 is a block diagram illustrating a virtual currency settlement apparatus 600 according to an exemplary embodiment. The apparatus may be a mobile phone, a computer, a digital broadcast terminal, a messaging device, a gaming console, a tablet device, a medical device, a fitness device, a personal digital assistant, and the like.

Referring to FIG. 6, apparatus 600 may include one or more of the following components: processing component 602, memory 604, power assembly 606, multimedia assembly 608, audio component 610, I/O (Input/Output) interface 612, sensor assembly 614, and communication assembly 616.

The processing component 602 typically controls the overall operations of apparatus 600, such as operations associated with display, telephone calls, data communications, camera operations, and recording operations. The processing component 602 may include one or more processors 720 to execute instructions to perform all or part of the steps in the forgoing description. Moreover, the processing component may include one or more modules to facilitate interaction between component 602 and other components. For example, processing component 602 may include a multimedia module to facilitate interaction between multimedia assembly 608 and processing component 602.

The memory 604 is configured to store various types of data to support operation of the apparatus 600. Examples of such data include instructions for any application or method operating on apparatus 600, contact data, phone book data, messages, pictures, videos, and the like. The memory 604 may be implemented by any type of volatile or non-volatile storage devices, or combinations thereof, such as SRAM (Static Random Access Memory, Static Random Access Memory), EEPROM (Electrically-Erasable Programmable Read-Only Memory, electrical Erasable programmable read only memory, EPROM (Erasable Programmable Read Only Memory), PROM (Programmable Read-Only Memory), ROM (Read-Only Memory, Read only memory), magnetic memory, flash memory, disk or optical disk.

The power assembly 606 provides power to the various components of the apparatus 600. The power assembly 606 may include a power management system, one or more power sources, and other components associated with generating, managing, and distributing power for apparatus 600.

The multimedia assembly 608 may include a screen that provides an output interface. In certain embodiments, the screen may include an LCD (Liquid Crystal Display) and a TP (Touch Panel). If the screen includes a touch panel, the screen can be implemented as a touch screen to receive input signals from a user. The touch panel may include one or more touch sensors to sense touches, swipes, and gestures on the touch panel. The touch sensor may sense not only the boundary of the touch or sliding action, but also the duration and pressure associated with the touch or slide operation. In some embodiments, the multimedia assembly 608 may include a front camera and/or a rear camera. When the apparatus 600 is in an operational mode, such as a shooting mode or a video mode, the front camera and/or the rear camera may receive external multimedia data. Each front and rear camera may be a fixed optical lens system or have focal length and optical zoom capabilities.

The audio component 610 is configured to output and/or input an audio signal. For example, the audio component 610 may include a MIC (Microphone) that is configured to receive an external audio signal when the apparatus 600 is in an operational mode, such as a call mode, a recording mode, and a voice recognition mode. The received audio signal may be further stored in the memory 604 or transmitted via the communication assembly 616. In some embodiments, the audio component 610 may also include a speaker for outputting an audio signal.

The I/O interface 612 provides an interface between the processing component 602 and the peripheral interface module, which may be a keyboard, a click wheel, a button, or the like. These buttons may include, but are not limited to, a home button, a volume button, a start button, and a lock button.

Sensor assembly 614 includes one or more sensors for providing state assessment of various aspects to apparatus 600. For example, sensor assembly 614 may detect an on/off state of apparatus 600, a relative positioning of components, such as a display and a keypad of apparatus 600. The sensor assembly 614 may also detect a change in position of apparatus 600 or a component of apparatus 600, the presence or absence of user contact, or changes in temperature, orientation or acceleration/deceleration of the apparatus 600. The sensor assembly 614 may include a proximity sensor configured to detect the presence of nearby objects without any physical contact. The sensor assembly 614 may further include a light sensor, such as CMOS (Complementary Metal Oxide Semiconductor) or CXD (Charge-coupled Device) image sensor, for use in imaging applications. In some embodiments, the sensor assembly 614 may also include an acceleration sensor, a gyro sensor, a magnetic sensor, a pressure sensor, or a temperature sensor.

The communication assembly 616 is configured to facilitate wired or wireless communication between apparatus 600 and other devices. The apparatus 600 may access a wireless network according to a communication standard, such as WiFi, 2G or 3G, or a combination thereof. In an exemplary embodiment, communication assembly 616 receives broadcast signals or broadcast associated information from an external broadcast management system via a broadcast channel. In one exemplary embodiment, the communication assembly 616 further includes a communication NFC (Near-field communication) module to facilitate short-range communications. For example, the NFC module can be implemented with RFID (Radio Frequency Identification) technologies, IrDA (Infra-red Data Association) technologies, UWB (ultrawideband) technologies, BT (Bluetooth) technologies, and so on.

In an exemplary embodiment, the apparatus 600 may be implemented with one or more ASICs (Application Specific Integrated Circuits), DSP (Digital Signal Processor) Device, PLD (Programmable Logic Device), FPGA (Field Programmable Gate Array), controller, microcontroller, microprocessor or other electronic component implementation for executing the forgoing currency settlement method.

In an exemplary embodiment, there is also provided a non-transitory computer readable storage medium including instructions, such as a memory 604 including instructions executable by the processor 720 of apparatus 600 to perform the methods in the forgoing description. For example, the non-transitory computer readable storage medium may be ROM (Read-Only Memory), RAM (Random Access Memory), CDROM (Compact Disc Read-Only Memory), tape, floppy disks, optical data storage devices, and so on.

The non-transitory computer readable storage medium, when the instructions in the storage medium are executed by a processor of the currency settlement apparatus, enables the currency settlement apparatus to execute the currency settlement methods in the forgoing description.

When the foregoing described embodiments are implemented in a form of a software functional module or submodule and sold or used as an independent product, the integrated software module or submodule may be computer programs stored in the foregoing computer readable storage medium. Based on such an understanding, the technical solutions of this application, or all or some of the technical solutions may be implemented in a form of a software product by one or more processors executing the software modules. The computer software product modules or submodules may be stored in a storage medium and includes several instructions for instructing one or more computer devices (which may be a personal computer, a server, a network device, or the like) to perform all or some of the steps of the methods described in the embodiments of this application.

In addition, functional modules or units in the embodiments of this application may be integrated into one processing unit, or each of the units may exist alone physically, or two or more units are integrated into one unit. The functional module or unit may be implemented in a form of hardware, in a form of software functional modules and units, or may be implemented by a combination of software and hardware components Other embodiments of the disclosure will be apparent to those skilled in the art. The present disclosure is intended to cover any variations, uses, or adaptations that are in accordance with the general principles of the present disclosure.

The specification and examples of the present disclosure are to be considered as illustrative only.

It is to be understood that the disclosure is not limited to the precise structures shown and described in the drawings, and various modifications and changes can be made without departing from the scope thereof.

What is claimed is:

1. A virtual currency settlement method, comprising:
detecting, by a cryptocurrency mining pool system, that a mining node is accessing the cryptocurrency mining pool system;
acquiring, by the cryptocurrency mining pool system, a node identifier associated with the mining node;
acquiring, by the cryptocurrency mining pool system, two or more settlement currency types set by a user;
storing, by the cryptocurrency mining pool system, the node identifier and the two or more settlement currency types in a storage device;
in response to two or more settlement currency types being acquired, determining, by the cryptocurrency mining pool system, a priority rank of the two or more settlement currency types;
identifying, by the cryptocurrency mining pool system, a settlement currency type according to the priority rank of the two or more settlement currency types, wherein if the cryptocurrency mining pool system is unable to make a determination of a settlement is based on a settlement currency type with the highest priority rank, identifying, by the cryptocurrency mining pool system, a settlement currency type of a next priority rank;

settling, by the cryptocurrency mining pool system, with the mining node according to a type of a first virtual currency so that the cryptocurrency mining pool system acquires the first virtual currency from the mining node;

according to the identified settlement currency type, transacting, by the cryptocurrency mining pool system, with an exchange institution to exchange an amount in the first virtual currency into an amount in a second virtual currency, the second virtual currency having a same currency type as the settlement currency type; and transferring, by the cryptocurrency mining pool system, the amount of the second virtual currency to an account.

2. The method according to claim 1, further comprising:

sending, by the cryptocurrency mining pool system, a transaction request to the exchange institution, the exchange institution identifying a transaction partner according to the transaction request, the transaction request including at least the settlement currency type and the amount of the first virtual currency;

receiving, by the cryptocurrency mining pool system, a transaction confirmation command from the exchange institution;

transferring, by the cryptocurrency mining pool system, the amount of the first virtual currency to the exchange institution, the exchange institution transferring the amount of the first virtual currency to the transaction partner; and receiving, by the cryptocurrency mining pool system, the amount of the second virtual currency from the exchange institution.

3. The method according to claim 1, wherein after transferring the amount of the second virtual currency to the account, the method further comprises:

determining, by the cryptocurrency mining pool system, an exchange rate between the first virtual currency and the second virtual currency; and sending, by the cryptocurrency mining pool system, the exchange rate to the mining node so that the mining node presents the exchange rate on a user interface.

4. A virtual currency settlement apparatus for a cryptocurrency mining pool system, comprising:

a memory storing one or more computer programs; and a processor coupled to the memory and configured to perform:

detecting that a mining node is accessing the cryptocurrency mining pool system;

acquiring a node identifier associated with the mining node;

acquiring two or more settlement currency types set by a user;

storing the node identifier and the two or more settlement currency types in a storage device;

in response to two or more settlement currency types being acquired, determining a priority rank of the two or more settlement currency types;

identifying a settlement currency type according to the priority rank of the two or more settlement currency types, wherein if the cryptocurrency mining pool system is unable to make a determination of a settlement is based on a settlement currency type with the highest priority rank, identifying a settlement currency type of a next priority rank;

settling with a the mining node according to a type of a first virtual currency so that the cryptocurrency mining pool system acquires the first virtual currency from the mining node;

according to the identified settlement currency type, transacting with an exchange institution to exchange an amount in the first virtual currency into an amount in a second virtual currency, the second virtual currency having a same currency type as the settlement currency type; and transferring the amount of the second virtual currency to an account.

5. The currency settlement apparatus according to claim 4, wherein the processor is further configured to perform:

sending a transaction request to the exchange institution, the exchange institution identifying a transaction partner according to the transaction request, the transaction request including at least the settlement currency type and the amount in the first virtual currency;

receiving a transaction confirmation command from the exchange institution;

transferring the amount of the first virtual currency to the exchange institution, the exchange institution transferring the amount of the first virtual currency to the transaction partner; and receiving the amount of the second virtual currency from the exchange institution.

6. The currency settlement apparatus according to claim 4, wherein after transferring the amount of the second virtual currency to the account, the processor is further configured to perform:

determining an exchange rate between the first virtual currency and the second virtual currency; and sending the exchange rate to the mining node, the mining node presenting the exchange rate.

* * * * *